US012659980B2

(12) United States Patent
Fukui

(10) Patent No.: US 12,659,980 B2
(45) Date of Patent: Jun. 16, 2026

(54) RESOURCE ALLOCATION USING LOAD BALANCING TECHNIQUES IN MOBILE NETWORKS

(71) Applicant: NEC Corporation, Tokyo (JP)

(72) Inventor: Keiji Fukui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 18/240,443

(22) Filed: Aug. 31, 2023

(65) Prior Publication Data

US 2024/0080873 A1 Mar. 7, 2024

(30) Foreign Application Priority Data

Sep. 5, 2022 (JP) ................................. 2022-140908

(51) Int. Cl.
*H04W 72/52* (2023.01)
*H04W 72/04* (2023.01)

(52) U.S. Cl.
CPC ........... *H04W 72/52* (2023.01); *H04W 72/04* (2013.01)

(58) Field of Classification Search
CPC ..... H04L 5/0078; H04L 5/003; H04L 5/0058; H04L 5/0085; H04W 72/52; H04W 72/04
See application file for complete search history.

(56) References Cited

U.S. PATENT DOCUMENTS

2005/0096089 A1* 5/2005 Ishii ...................... H04W 28/26
455/560
2008/0274749 A1* 11/2008 Heo ...................... H04L 1/1887
455/452.1

2009/0323523 A1* 12/2009 Tatezono .............. H04W 24/02
370/229
2010/0165905 A1* 7/2010 Kanazawa ............ H04W 72/30
370/312
2014/0198740 A1* 7/2014 Shinojima ............... H04L 5/003
370/329
2015/0103789 A1* 4/2015 Tanaka .................. H04W 72/27
370/329
2022/0303854 A1* 9/2022 Salkintzis ......... H04W 36/0044

FOREIGN PATENT DOCUMENTS

JP 2014-057216 A 3/2014
JP 2016-508296 A 3/2016
JP 6044813 B2 12/2016
JP 6189311 B2 8/2017
JP 2021-052409 A 4/2021

* cited by examiner

*Primary Examiner* — Rushil P. Sampat
(74) *Attorney, Agent, or Firm* — Sughrue Mion, PLLC

(57) ABSTRACT

A processing load in a base station apparatus is reduced, while also suitably controlling the amount of resources usable by each telecommunications provider. A setting section sets, based on a minimum number of connections with respect to each of a plurality of mobile communication networks, as notified by each of the mobile communication networks, shared resources that are shared by the plurality of mobile communication networks, and individual resources for each of the mobile communication networks, the shared resources and individual resources being from among processing resources of a base station apparatus. In accordance with a connection request from a terminal apparatus with respect to the base station apparatus, a connection control section allocates processing resources to be used for the terminal apparatus from among the shared resources in a case where at least a portion of the shared resources is remaining.

10 Claims, 9 Drawing Sheets

FIG. 6

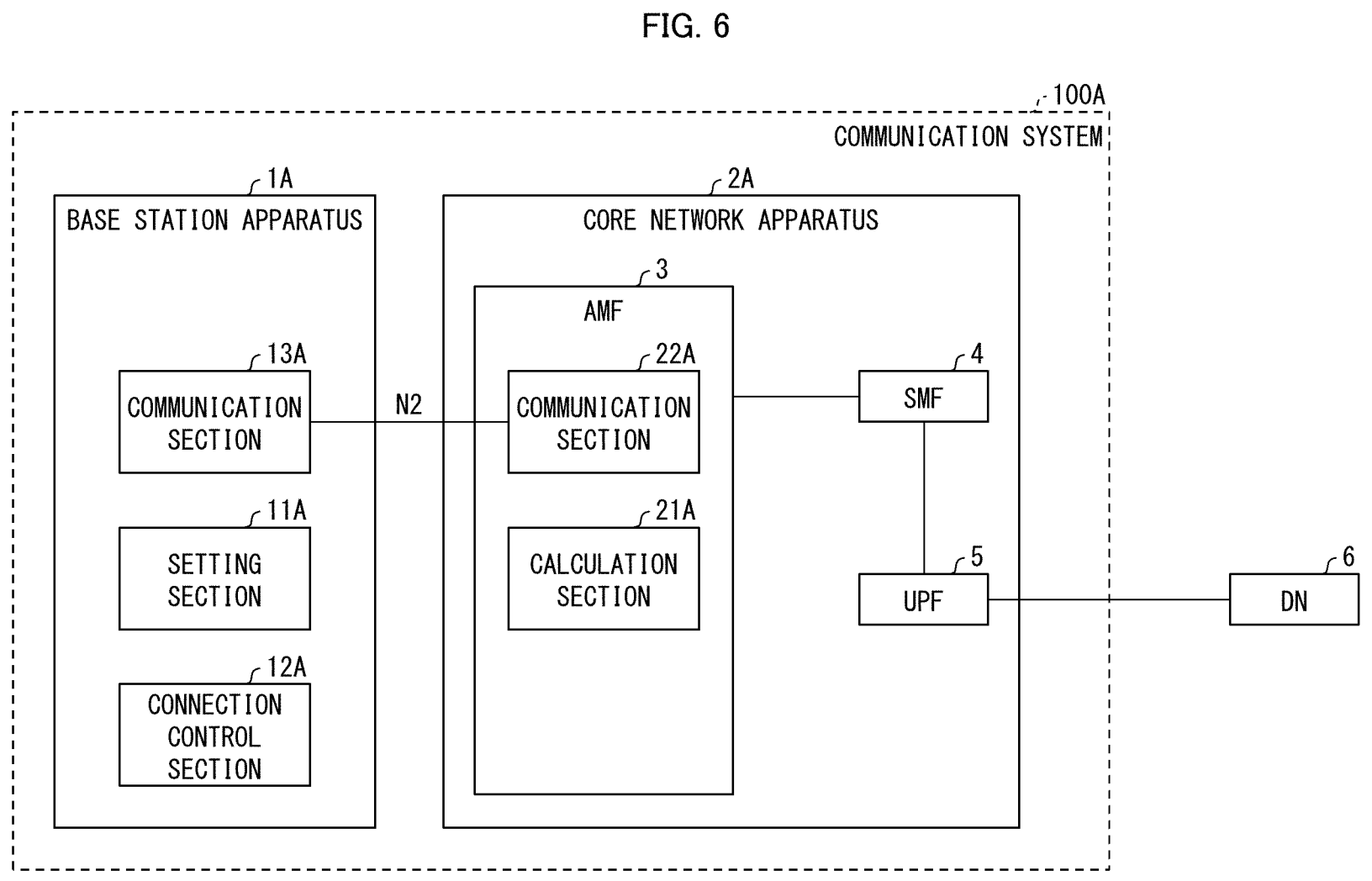

COMMUNICATION SYSTEM 100A

BASE STATION APPARATUS 1A

COMMUNICATION SECTION 13A

SETTING SECTION 11A

CONNECTION CONTROL SECTION 12A

N2

CORE NETWORK APPARATUS 2A

AMF 3

COMMUNICATION SECTION 22A

CALCULATION SECTION 21A

SMF 4

UPF 5

DN 6

RESOURCE ALLOCATION USING LOAD BALANCING TECHNIQUES IN MOBILE NETWORKS

This Nonprovisional application claims priority under 35 U.S.C. § 119 on Patent Application No. 2022-140908 filed in Japan on Sep. 5, 2022, the entire contents of which are hereby incorporated by reference.

TECHNICAL FIELD

The present invention relates to a base station apparatus, a core network apparatus, method for controlling a base station apparatus, and a program.

BACKGROUND ART

In recent years, mobile networks have become important infrastructure, and various telecommunications providers have been expanding their service provision areas. A plurality of telecommunications providers each have constructed a radio access network (RAN) in their respective service provision areas, the RAN is connected with a core network. As a related technology, there is an invention disclosed in Patent Literature 1 below.

Patent Literature 1 indicates that a shared base station is owned and operated by a provider A, a provider B, or a third party (for example, a further network provider), and a network provider enters into a contract in which a specific proportion of available resources in the shared base station is provided.

CITATION LIST

Patent Literature

[Patent Literature 1]
    Published Japanese Translation of PCT International
        Application Tokuhyo No. 2016-508296

SUMMARY OF INVENTION

Technical Problem

Construction of a RAN requires a significant amount of effort, time, and cost, involving antenna installation, area selection, and the like. For this reason, there is trend of sharing RANs, and network sharing providers have appeared. With such a scheme, a plurality of telecommunications providers share a RAN, thereby reducing costs and achieving earlier commencement of service.

However, a RAN has limited resources (memory resources and CPU resources used by connection by a subscriber), which could be taken up by traffic of a specific telecommunications provider. Therefore, when there are more connections from a specific telecommunications provider than the number allowed by a system, there are cases where subscribers of another telecommunications provider that shares the network cannot connect. Furthermore, if each telecommunications provider requests an excessive amount of RAN resources, there is a need to install RAN equipment having more resources than what is normally required.

Patent Literature 1 indicates that a network provider enters into a contract in which a specific proportion of available resources in the shared base station is provided, and after a telecommunications provider has completely used resources reserved for that telecommunications provider, a shared portion (shared resources) can be used for a communications bearer for that telecommunications provider. Therefore, it is necessary to manage the amount of resources used by each telecommunications provider up to when each telecommunications provider completely uses the resources reserved for that telecommunications provider. This increases the processing load in the shared base station.

An example aspect of the present invention is accomplished in view of the foregoing problems. An example object thereof is to provide technology that makes it possible reduce the processing load in a base station apparatus, while also suitably controlling the amount of resources usable by each telecommunications provider.

Solution to Problem

A base station apparatus according to an example aspect of the present invention is a base station apparatus including at least one processor, the at least one processor being configured to carry out: a setting process for setting, based on a minimum number of connections with respect to each of a plurality of mobile communication networks that share the base station apparatus as notified by each of the mobile communication networks, shared resources that are shared by the plurality of mobile communication networks, and individual resources for each of the mobile communication networks, the shared resources and individual resources being from among processing resources of the base station apparatus; and a process for, in accordance with a connection request from a terminal apparatus with respect to the base station apparatus, allocating the processing resources to be used for the terminal apparatus from among the shared resources in a case where there is no shortage of the shared resources, and in a case where there is a shortage of the shared resources, allocating the processing resources to be used for the terminal apparatus from among the individual resources for the mobile communication network to which the terminal apparatus will connect.

A core network apparatus according to one example aspect of the present invention is a core network apparatus of a mobile communication network, including at least one processor, the at least one processor being configured to carry out: a calculation process for calculating a minimum number of connections with respect to the mobile communication network, based on statistical information of traffic of the mobile communication network; and a notification process for providing notification of the minimum number of connections with respect to the mobile communication network that has been calculated, to a base station apparatus shared by a plurality of mobile communication networks which include the mobile communication network.

A method for controlling a base station apparatus according to one example aspect of the present invention is a method for controlling a base station apparatus, including: the base station apparatus setting, based on a minimum number of connections with respect to each of a plurality of mobile communication networks that share the base station apparatus as notified by each of the mobile communication networks, shared resources that are shared by the plurality of mobile communication networks, and individual resources for each of the mobile communication networks, the shared resources and individual resources being from among processing resources of the base station apparatus; and the base station apparatus performing, in accordance with a connection request from a terminal apparatus with respect to the base station apparatus, allocation of the processing resources to be used for the terminal apparatus from among the shared resources in a case where there is no shortage of the shared resources, and in a case where there is a shortage of the shared resources, allocation of the processing resources to be used for the terminal apparatus from among the individual resources for the mobile communication network to which the terminal apparatus will connect.

Advantageous Effects of Invention

An example aspect of the present invention makes it possible reduce the processing load in a base station apparatus, while also suitably controlling the amount of resources usable by each telecommunications provider.

BRIEF DESCRIPTION OF DRAWINGS

FIG. 6 is a block diagram illustrating a configuration example of a communication system according to a second example embodiment of the present invention.

EXAMPLE EMBODIMENTS

First Example Embodiment

Figure 1:
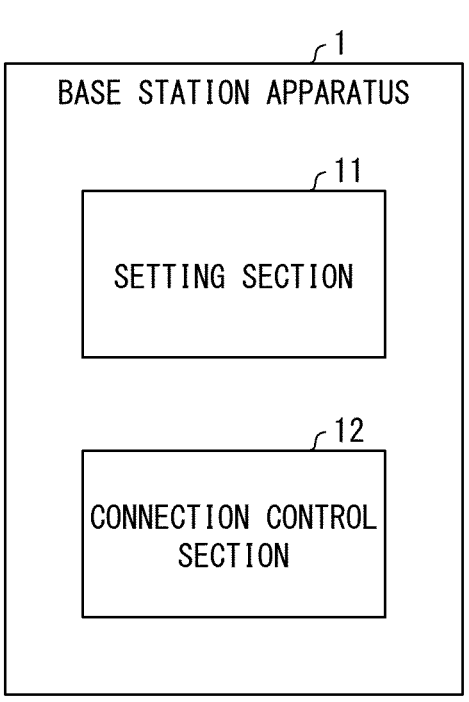
FIG. 1 is a block diagram illustrating a configuration example of a base station apparatus according to a first example embodiment of the present invention.

<Base Station Apparatus 1 According to First Example Embodiment>

The following will discuss in detail a first example embodiment of the present invention, with reference to drawings. The present example embodiment is a basic form of example embodiments described later. Note that reference signs which are indicated in the drawings and are used in this overview are given to elements for convenience as an example for assisting in understanding, and are not intended to limit the present invention to the illustrated aspects. The connection lines between blocks in the drawings and the like referred to in the descriptions below include both a bidirectional relation and a unidirectional relation. The one-way arrow schematically indicates a flow of a main signal (data), and does not exclude bidirectionality. The connection point of an input and an output of each of the blocks in the drawings may be configured to include a port or an interface. The configurations of these are not illustrated.

FIG. 1 is a block diagram illustrating a configuration example of a base station apparatus 1 according to the first example embodiment of the present invention. The base station apparatus 1 according to the present example embodiment is a base station apparatus that is shared by a plurality of mobile communication networks, and that includes a setting section 11 and a connection control section 12, as illustrated in FIG. 1.

Each of the mobile communication networks are a fifth-generation mobile communication system (5G) network, a fourth-generation mobile communication system (4G) network, a local 5G network, a local 4G network, or the like that is defined by the third-generation mobile communication system partnership project (3GPP). Each of the mobile communication networks may have a RAN and a core network, or may have only a core network.

Because the base station apparatus 1 is shared by a plurality of mobile communication networks, resources (memory resources and CPU resources used by connection by a subscriber) of the base station apparatus 1 are shared by the plurality of mobile communication networks.

The setting section 11 sets, based on a minimum number of connections with respect to each of the mobile communication networks as notified by each of the mobile communication networks, shared resources that are shared by the plurality of mobile communication networks, and individual resources for each of the mobile communication networks, the shared resources and individual resources being from among processing resources of the base station apparatus 1.

The minimum number of connections is the minimum required number of connections of subscribers of a provider of each one of the mobile communication networks that shares the base station apparatus 1, which minimum number is requested by that provider. The processing resources of the base station apparatus 1 are resources corresponding to the memory resources and the CPU resources of the base station apparatus 1. From these processing resources, resources required by a connection request from a subscriber are allocated.

The individual resources are resources corresponding to the minimum number of connections notified by each mobile communication network. The amount of individual resources can be calculated as, for example, the average value of memory resources or CPU resources required for a connection by one subscriber times the minimum number of connections.

The shared resources are resources that are available for shared use by each of the mobile communication networks. The amount of shared resources is, for example, a value obtained by subtracting the combined amount of individual resources of each mobile communication network from the total amount of processing resources of the base station apparatus 1.

In accordance with a connection request from a terminal apparatus with respect to the base station apparatus 1, the connection control section 12 allocates processing resources to be used for the terminal apparatus from among the shared resources in a case where at least a portion of the shared resources is remaining, and in a case where none of the shared resources are remaining, allocates processing resources to be used for the terminal apparatus from among individual resources for the mobile communication network to which the terminal apparatus will connect.

When there is a connection request from a terminal apparatus with respect to the base station apparatus 1, the connection control section 12 first allocates processing resources to be used for that terminal apparatus from the shared resources. Each time there is a connection request from a terminal apparatus, the connection control section 12 determines whether or not there are shared resources remaining.

In a case where there is a connection request from a terminal apparatus with respect to the base station apparatus 1 and the connection control section 12 determines that none of the shared resources are remaining, the connection control section 12 allocates processing resources to be used for the terminal apparatus from among the individual resources for the mobile communication network to which the terminal apparatus will connect. Therefore, when there are no shared resources remaining, individual resources that correspond to the provider of the mobile communication network for which a user of the terminal apparatus has entered a contract are used.

<Example Advantage of Base Station Apparatus 1>

As described above, in the base station apparatus 1 according to the present example embodiment, the connection control section 12 allocates processing resources to be used for a terminal apparatus from among the shared resources in a case where at least a portion of the shared resources is remaining. Therefore, when the base station apparatus 1 can operate within the scope of shared resources, there is no need to distinguish between the providers of the mobile communication networks, and the processing load can be reduced.

Furthermore, in a case where none of the shared resources are remaining, the connection control section 12 allocates processing resources to be used for the terminal apparatus from among the individual resources for the mobile communication network to which that terminal apparatus will connect. Therefore, it is possible to prevent provision of an excess amount of resources to a provider of a specific mobile communication network.

<Flow of Processing Method by Base Station Apparatus 1>

Figure 2:
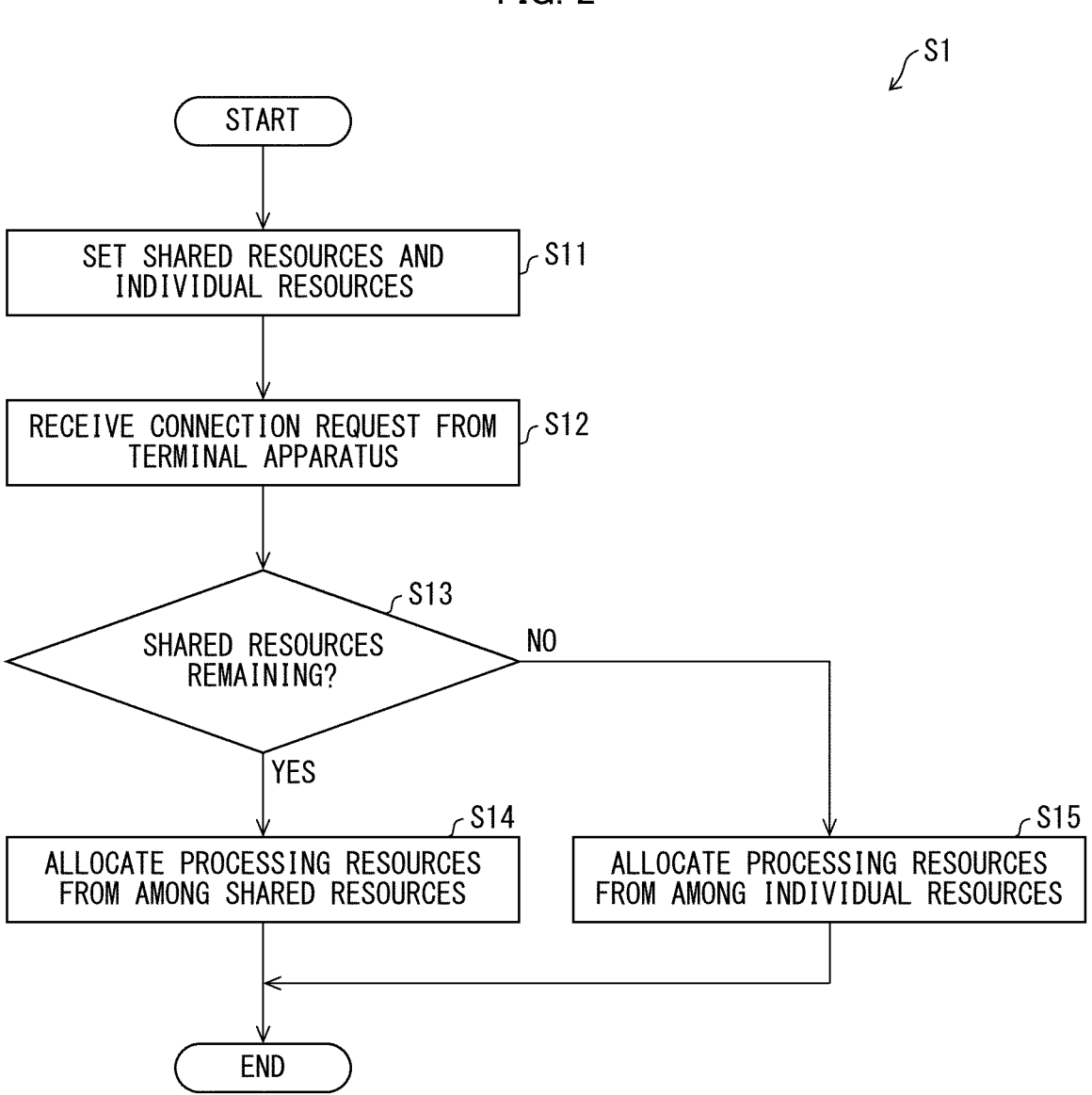
FIG. 2 is a flowchart illustrating a flow of a processing method that is carried out by the base station apparatus according to the first example embodiment of the present invention.

The following description will discuss a flow of a processing method that is carried out by the base station apparatus 1 configured as described above, with reference to FIG. 2. FIG. 2 is a flowchart illustrating a flow of the processing method that is carried out by the base station apparatus 1 according to the first example embodiment. As illustrated in FIG. 2, a processing method S1 includes steps S11 through S15.

The setting section 11 of the base station apparatus 1 shared by the plurality of mobile communication networks sets, based on a minimum number of connections with respect to each of the mobile communication networks as notified by each of the mobile communication networks, shared resources that are shared by the plurality of mobile communication networks, and individual resources for each of the mobile communication networks, the shared resources and individual resources being from among processing resources of the base station apparatus 1 (S11).

Each of the mobile communication networks is, for example, a 5G network, a 4G network, a local 5G network, a local 4G network, or the like that is defined by 3GPP. Each of the mobile communication networks may have a RAN and a core network, or may have only a core network.

The minimum number of connections is the minimum required number of connections of subscribers of a provider of each one of the mobile communication networks that shares the base station apparatus 1, which minimum number is requested by that provider. The individual resources are resources corresponding to the minimum number of connections notified by each mobile communication network. The shared resources are resources that are available for shared use by each of the mobile communication networks.

Next, once the base station apparatus 1 receives a connection request from a terminal apparatus (S12), the connection control section 12 determines whether or not at least a portion of the shared resources are remaining (S13). In accordance with the connection request from the terminal apparatus with respect to the base station apparatus 1, in a case where at least a portion of the shared resources is remaining (S13, Yes), the connection control section 12 allocates processing resources to be used for the terminal apparatus from among the shared resources (S14).

Furthermore, in a case where none of the shared resources are remaining (S13, No), the connection control section 12 allocates processing resources to be used for the terminal apparatus from among the individual resources for the mobile communication network to which that terminal apparatus will connect (S15).

<Example Advantage of Processing Method by Base Station Apparatus 1>

As described above, in the processing method carried out by the base station apparatus 1 according to the present example embodiment, the connection control section 12 allocates processing resources to be used for a terminal apparatus from among the shared resources in a case where at least a portion of the shared resources is remaining. Therefore, when the base station apparatus 1 can operate within the scope of shared resources, there is no need to distinguish between the providers of the mobile communication networks, and the processing load can be reduced.

Furthermore, in a case where none of the shared resources are remaining, the connection control section 12 allocates processing resources to be used for the terminal apparatus from among the individual resources for the mobile communication network to which that terminal apparatus will connect. Therefore, it is possible to prevent provision of an excess amount of resources to a provider of a specific mobile communication network.

<Core Network Apparatus 2 According to First Example Embodiment>

Figure 3:
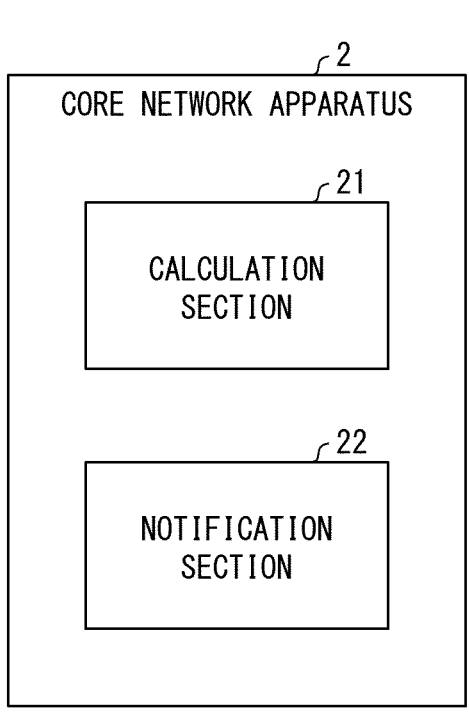
FIG. 3 is a block diagram illustrating a configuration example of a core network apparatus according to the first example embodiment of the present invention.

FIG. 3 is a block diagram illustrating a configuration example of a core network apparatus 2 according to the first example embodiment of the present invention. The core network apparatus 2 according to the present example embodiment is a core network apparatus of a mobile communication network and includes a calculation section 21 and a notification section 22, as illustrated in FIG. 3.

The calculation section 21 calculates a minimum number of connections with respect to the mobile communication network, based on statistical information of the traffic of the mobile communication network. For example, the calculation section 21 calculates, as the minimum number of connections with respect to the mobile communication network, a value that is proportional to the amount of traffic in a prescribed period for the mobile communication network.

The notification section 22 provides notification of the minimum number of connections with respect to the mobile communication network, as calculated by the calculation section 21, to a base station apparatus 1 shared by a plurality of mobile communication networks which include the mobile communication network.

As described above, a setting section 11 of the base station apparatus 1 sets, based on the minimum number of connections with respect to each of the mobile communication networks as notified by each of the mobile communication networks, shared resources that are shared by the plurality of mobile communication networks, and individual resources for each of the mobile communication networks, the shared resources and individual resources being from among processing resources of the base station apparatus 1.

<Example Advantage of Core Network Apparatus 2>

As explained above, in the core network apparatus 2 according to the present example embodiment, the notification section 22 provides notification, to the base station apparatus 1, of the minimum number of connections with respect to the mobile communication network, as calculated by the calculation section 21. Therefore, the base station apparatus 1 can easily set the shared resources to be shared by the plurality of mobile communication networks and the individual resources for each mobile communication network.

<Flow of Processing Method by Core Network Apparatus 2>

Figure 4:
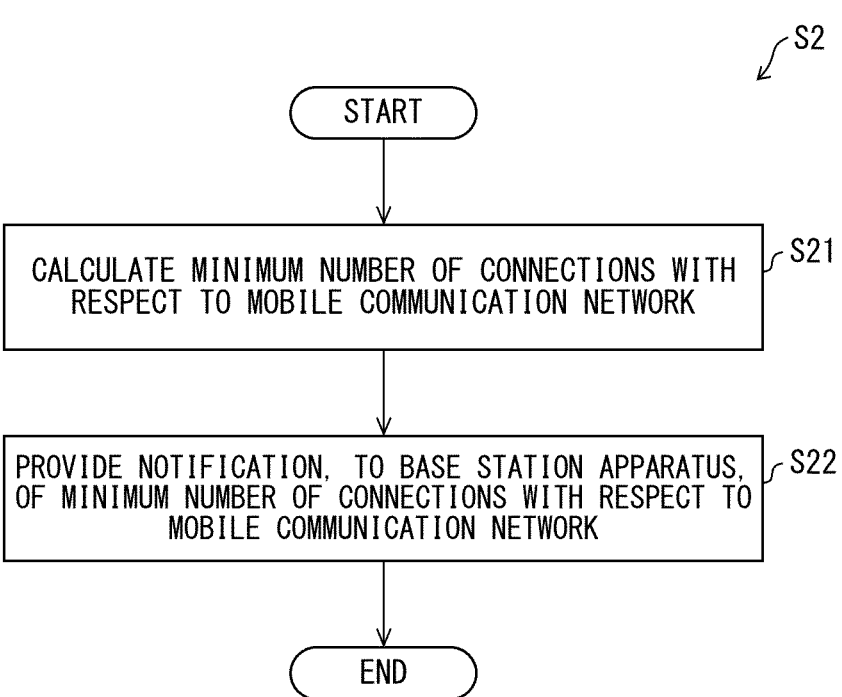
FIG. 4 is a flowchart illustrating a flow of a processing method that is carried out by the core network apparatus according to the first example embodiment of the present invention.

The following description will discuss a flow of a processing method that is carried out by the core network apparatus 2 configured as described above, with reference to FIG. 4. FIG. 4 is a flowchart illustrating a flow of a processing method that is carried out by the core network apparatus 2 according to the first example embodiment. As illustrated in FIG. 4, a processing method S2 includes steps S21 and S22.

First, the calculation section 21 of the core network apparatus 2 calculates a minimum number of connections with respect to the mobile communication network, based on statistical information of the traffic of the mobile communication network (S21). For example, the calculation section 21 can calculate, as the minimum number of connections with respect to the mobile communication network, a value that is proportional to the amount of traffic in a prescribed period for the mobile communication network.

Next, the notification section 22 provides notification of the minimum number of connections with respect to the mobile communication network, as calculated by the calculation section 21, to the base station apparatus 1 shared by the plurality of mobile communication networks which include the mobile communication network (S22).

Communication System 100 According to First
Example Embodiment

Figure 5:
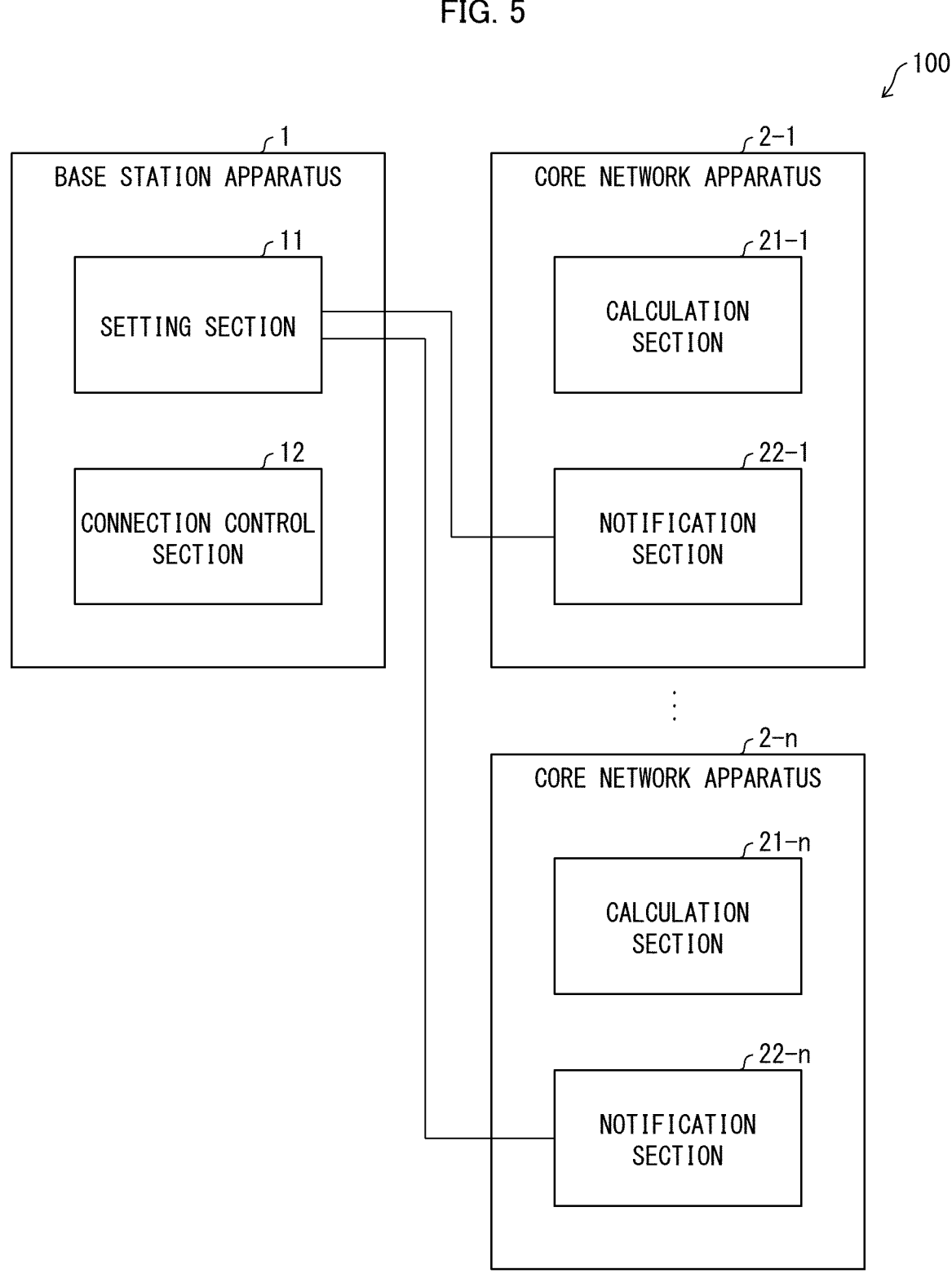
FIG. 5 is a block diagram illustrating a configuration example of a communication system according to the first example embodiment of the present invention.

FIG. 5 is a block diagram illustrating a configuration example of a communication system 100 according to the first example embodiment of the present invention. The communication system 100 in accordance with the present example embodiment includes core network apparatuses 2-1 through 2-n of a plurality of mobile communication networks, and a base station apparatus 1 shared by the plurality of mobile communication networks.

Notification sections 22-1 through 22-n of the core network apparatuses 2-1 through 2-n each provide notification, to the base station apparatus 1, of a minimum number of connections with respect to a corresponding one of the mobile communication networks. The minimum number of connections is the minimum required number of connections of subscribers of a provider of each one of the mobile communication networks that shares the base station apparatus 1, which minimum number is requested by that provider.

The core network apparatuses 2-1 through 2-n may further include calculation sections 21-1 through 21-n which calculate a minimum number of connections with respect to a corresponding one of the mobile communication networks, on the basis statistical information of the traffic of that mobile communication network.

A setting section 11 of the base station apparatus 1 sets, based on the minimum number of connections with respect to each of the mobile communication networks as notified by each of the core network apparatuses 2-1 through 2-n of the mobile communication networks, shared resources that are shared by the plurality of mobile communication networks, and individual resources for each of the mobile communication networks, the shared resources and individual resources being from among processing resources of the base station apparatus 1.

In accordance with a connection request from a terminal apparatus with respect to the base station apparatus 1, in a case where at least a portion of the shared resources is remaining, a connection control section 12 of the base station apparatus 1 allocates processing resources to be used for the terminal apparatus from among the shared resources.

Furthermore, in a case where none of the shared resources are remaining, the connection control section 12 of the base station apparatus 1 allocates processing resources to be used for the terminal apparatus from among the individual resources for the mobile communication network to which that terminal apparatus will connect.

<Example Advantage of Communication System 100>

As described above, in the communication system 100 according to the present example embodiment, the connection control section 12 of the base station apparatus 1 allocates processing resources to be used for a terminal apparatus from among the shared resources in a case where at least a portion of the shared resources is remaining. Therefore, when the base station apparatus 1 can operate within the scope of shared resources, there is no need to distinguish between the providers of the mobile communication networks, and the processing load can be reduced.

Furthermore, in a case where none of the shared resources are remaining, the connection control section 12 of the base station apparatus 1 allocates processing resources to be used for the terminal apparatus from among the individual resources for the mobile communication network to which that terminal apparatus will connect. Therefore, it is possible to prevent provision of an excess amount of resources to a provider of a specific mobile communication network.

Second Example Embodiment

<Configuration Example of Communication System 100A According to Second Example Embodiment>

FIG. 6 is a diagram illustrating a configuration example of a communication system 100A according to a second example embodiment of the present invention. The communication system 100A according to the present example embodiment includes a base station apparatus 1A and a core network apparatus 2A. The core network apparatus 2A also has an access and mobility function (AMF) 3, a session management function (SMF) 4, and a user plane function (UPF) 5. FIG. 6 illustrates only one core network apparatus, but the following discussion assumes a configuration in which a plurality of core network apparatuses are connected to the base station apparatus 1A, as with the communication system 100 illustrated in FIG. 5.

In a 5G core network (5GC), an architecture is employed in which processing is carried out while a control plane (C-Plane) for control signal communication such as communication establishment is separated from a user plane (U-Plane) for user data communication. The C-Plane includes the AMF 3, the SMF 4, and the like. The U-Plane includes the UPF 5.

The AMF 3 is a network function (NF) that provides authentication, permission, mobility management, and the like of a UE (terminal apparatus), and controls the SMF 4. The SMF 4 is an NF that is responsible for session management of the UE, assignment of IP addresses, selection and control of the UPF 5 for data transfer, and the like.

In a case where the UE establishes a plurality of sessions, the AMF 3 can assign different SMFs 4 to the respective sessions so that the SMFs 4 independently manage the sessions and use different functions for the respective sessions. In the 5GC, management related to the UE is carried out by a single AMF 3, and traffic is handled by the SMF 4 for each individual network slice.

The UPF 5 is an NF that functions as an external protocol data unit (PDU) session point that interconnects with a data network (DN) 6, and carries out packet routing, forwarding, and the like.

The DN 6 is a data network external to the 5GC. The DN 6 includes a wide area network such as the Internet and a narrow area network such as a local area network (LAN).

Figure 7:
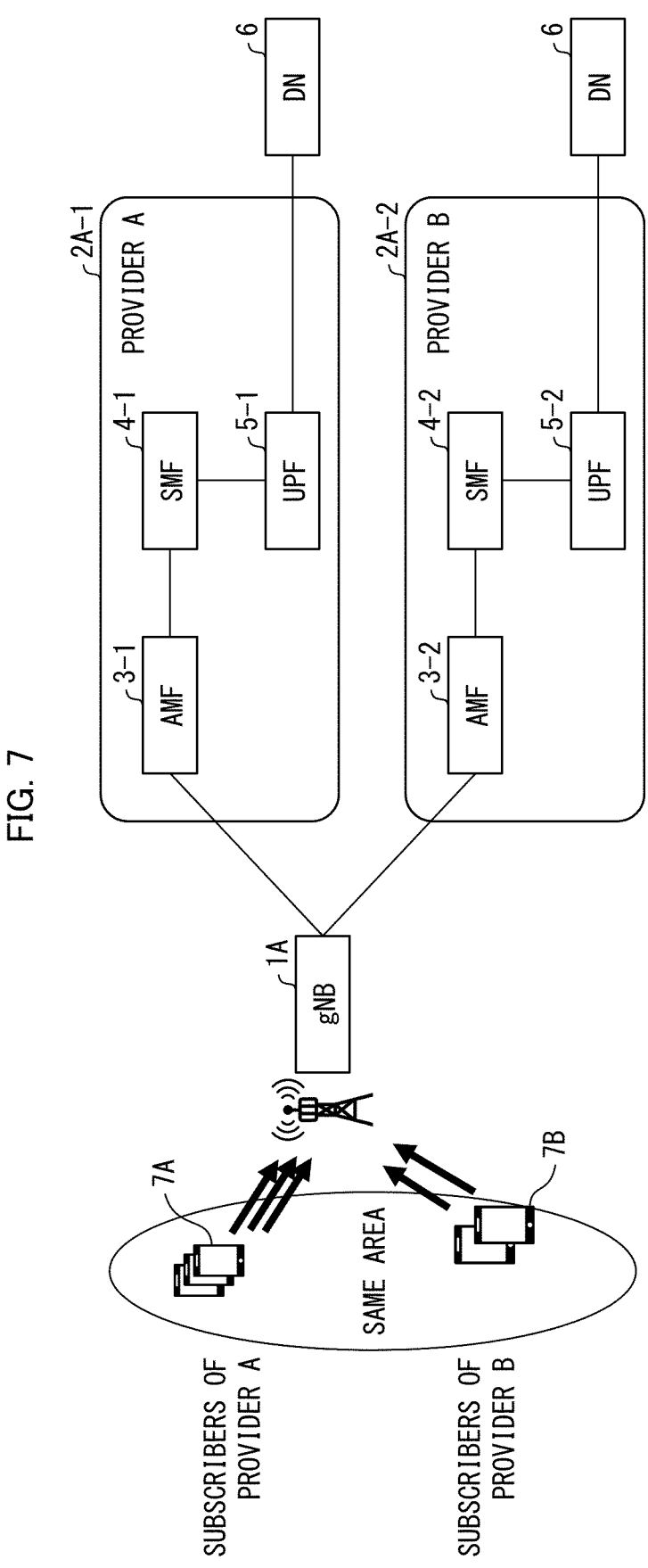
FIG. 7 is a diagram schematically illustrating operation of a communication system in a normal state.

FIG. 7 is a diagram schematically illustrating operation of the communication system 100A in a normal state. The base station apparatus (gNB) 1A is shared by a core network apparatus 2A-1, which is operated by a provider A of a mobile communication network, and a core network apparatus 2A-2, which is operated by a provider B of a mobile communication network. In FIG. 7, connections by terminal apparatuses 7A of subscribers of the provider A and terminal apparatuses 7B of subscribers of the provider B are within the range of the allowed number, and thus connection by all subscribers is possible.

Figure 8:
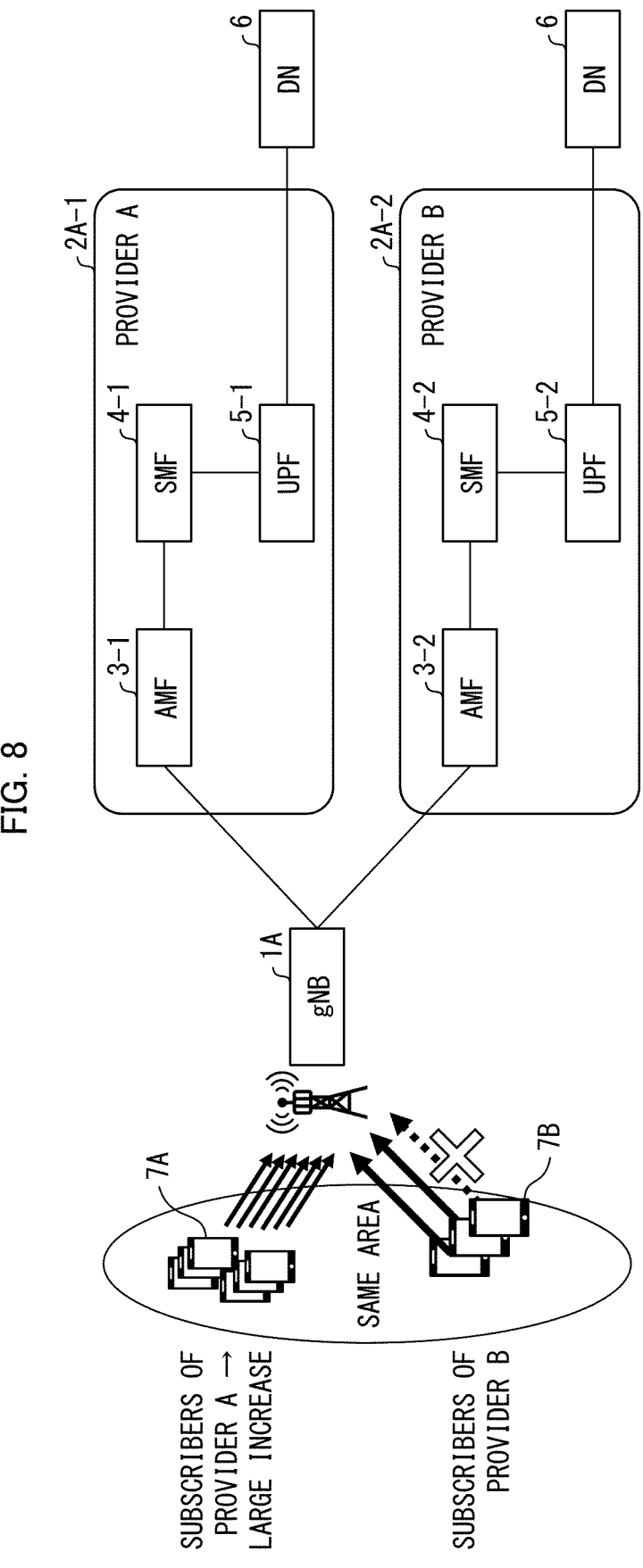
FIG. 8 is a diagram schematically illustrating operation of a communication system in a case where there has been a large increase in connections by subscribers of a provider A.

FIG. 8 is a diagram schematically illustrating operation of the communication system 100A in a case where there has been a large increase in connections by subscribers of the provider A. As illustrated in FIG. 8, in a case where there has been a large increase in connections by the terminal apparatuses 7A of subscribers of the provider A of a mobile communication network, and the number of connections by the terminal apparatuses 7A of the subscribers of the provider A and the terminal apparatuses 7B of the subscribers of the provider B has exceeded the allowed number, new connections cannot be made from the terminal apparatuses 7B, regardless of the fact that there is not a large number of connections by the subscribers of provider B.

The communication system 100A according to the present example embodiment prevents a case where an excessive number of connections by subscribers of a specific provider causes connections by subscribers of other providers to be rejected, as in FIG. 8.

Here, FIG. 6 is further discussed. The AMF 3 includes a calculation section 21A and a communication section 22A. The calculation section 21A is configured to realize the calculation section in the present example embodiment. The communication section 22A is configured to realize the notification section in the present example embodiment.

The calculation section 21A calculates a minimum number of connections with respect to a mobile communication network based on statistical information of the traffic of the mobile communication network and at least one selected from among: information that indicates the details of the contract between the provider of the mobile communication network and the provider of the base station apparatus; and the number of registered subscribers of the mobile communication network. In other words, the calculation section

21A may determine the minimum number of connections with respect to the mobile communication network based on: statistical information of the traffic of the mobile communication network; and information that indicates the details of the contract between the provider of the mobile communication network and the provider of the base station apparatus. Alternatively, the calculation section 21A may determine the minimum number of connections with respect to the mobile communication network based on: statistical information of the traffic of the mobile communication network; and the number of registered subscribers of the mobile communication network.

Discussed first is the example in which the calculation section 21A determines the minimum number of connections with respect to the mobile communication network based on: statistical information of the traffic of the mobile communication network; and the number of registered subscribers of the mobile communication network. For example, the calculation section 21A can use the amount of traffic of the mobile communication network in a prescribed period as the statistical information of the traffic of the mobile communication network. Furthermore, the number of registered subscribers of the mobile communication network is the total number of subscribers that can be registered for that mobile communication network.

The number of registered subscribers required for each provider must satisfy the following expression (expression 1).

$$\text{Number of registered subscribers required for each provider} > \text{Minimum number of connections with respect to each provider} \qquad \text{Expression 1:}$$

Furthermore, the number of subscribers that can be registered for the base station apparatus 1A must satisfy the following expressions (expression 2) and (expression 3).

$$\text{Number of subscribers that can be registered for base station apparatus } 1A > \text{minimum number of connections of provider 1} + \text{minimum number of connections of provider 2} + \ldots + \text{minimum number of connections of provider } n \qquad \text{Expression 2:}$$

$$\text{Number of subscribers that can be registered for base station apparatus } 1A > \text{number of registered subscribers required for each provider} \qquad \text{Expression 3:}$$

For example, the calculation section 21A may calculate the minimum number of connections with respect to a mobile communication network from the average value of the amount of traffic at the same time in the past seven days. Also, the calculation section 21A may calculate the number of registered subscribers of a mobile communication network from the peak amount of traffic in the past seven days.

Discussed next is the example configuration in which the calculation section 21A determines the minimum number of connections with respect to the mobile communication network based on: statistical information of the traffic of the mobile communication network; and information that indicates the details of the contract between the provider of the mobile communication network and the provider of the base station apparatus. The information that indicates the details of the contract between the provider of the mobile communication network (core network apparatus 2A) and the provider of the base station apparatus 1A is, for example, the minimum number of subscribers of the mobile communication network that the base station apparatus 1A can accommodate.

For example, the calculation section 21A can calculate the minimum number of connections with respect to a mobile communication network from: statistical information of the traffic of the mobile communication network; and the minimum number of subscribers of the mobile communication network that the base station apparatus 1A can accommodate.

Therefore, a greater amount of traffic of the mobile communication network in the prescribed period correlates to a greater minimum number of connections with respect to the mobile communication network, and a smaller amount of traffic of the mobile communication network in the prescribed period correlates to a smaller minimum number of connections with respect to the mobile communication network.

Similarly, a greater minimum number of subscribers of a mobile communication network that the base station apparatus 1A can accommodate correlates to a greater number of minimum number of connections with respect to the mobile communication network, and a smaller minimum number of subscribers of a mobile communication network that the base station apparatus 1A can accommodate correlates to a smaller number of minimum number of connections with respect to the mobile communication network.

The calculation section 21A calculates the minimum number of connections with respect to the mobile communication network from: the minimum number of connections calculated based on contract details; and the minimum number of connections based on the statistical information calculated as above.

The communication section 22A provides notification of the minimum number of connections with respect to the mobile communication network, as calculated by the calculation section 21A, to the base station apparatus 1A shared by the plurality of mobile communication networks. If the communication system 100A is, for example, a 5G system as defined by 3GPP, the communication section 22A provides notification, to the base station apparatus 1A, of the minimum number of connections, via an interface N2 between a next generation NodeB (gNB) which is the base station apparatus 1A and the AMF 3 of the core network apparatus 2A.

The base station apparatus 1A includes a setting section 11A, a connection control section 12A, and a communication section 13A. The setting section 11A is configured to realize the setting section in the present example embodiment. The connection control section 12A is configured to realize the connection control section in the present example embodiment.

The communication section 13A receives the minimum number of connections with respect to each mobile communication network as notified from a corresponding mobile communication network. If the communication system 100A is, for example, a 5G system as defined by 3GPP, the communication section 13A receives, from the core network apparatus 2A, the minimum number of connections, via an interface N2 between the gNB which is the base station apparatus 1A and the AMF 3 of the core network apparatus 2A.

The setting section 11A sets, based on a minimum number of connections with respect to each of the mobile communication networks as notified by each of the mobile communication networks, shared resources that are shared by the plurality of mobile communication networks, and individual resources for each of the mobile communication networks, the shared resources and individual resources being from among processing resources of the base station apparatus 1A.

In a case where the minimum number of connections notified by a first mobile communication network among the plurality of mobile communication networks exceeds an allowable value, the setting section 11A sets the amount of individual resources for the first mobile communication network to an amount in accordance with the allowable value.

The base station apparatus 1A has an allowable value set in advance for the minimum number of connections corresponding to each mobile communication network. For example, in a case where the minimum number of connections notified by the first mobile communication network exceeds the allowable value, the minimum number of connections for the first mobile communication network is set to the allowable value. This makes it possible to prevent setting an excessive minimum number of connections with respect to the first mobile communication network.

The setting section 11A provides notification, to the core network apparatus 2A of the first mobile communication network, via the communication section 13A, of the fact that the minimum number of connections with respect to the first mobile communication network has been set to the allowable value. This makes it possible for the core network apparatus 2A of the first mobile communication network to ascertain the minimum number of connections that has been permitted by the base station apparatus 1A.

In accordance with a connection request from a terminal apparatus with respect to the base station apparatus 1A, the connection control section 12A allocates processing resources to be used for the terminal apparatus from among the shared resources in a case where at least a portion of the shared resources is remaining, and in a case where none of the shared resources are remaining, allocates processing resources to be used for the terminal apparatus from among individual resources for the mobile communication network to which the terminal apparatus will connect.

In a case where all of the shared resources have been allocated and all individual resources for a second mobile communication network among the plurality of mobile communication networks have been allocated, the connection control section 12A rejects a new connection request from a terminal apparatus that connects to the second mobile communication network. Thus, the connection control section 12A can suppress the number of connections of subscribers of the second mobile communication network to the minimum number of connections corresponding to the second mobile communication network.

Figure 9:
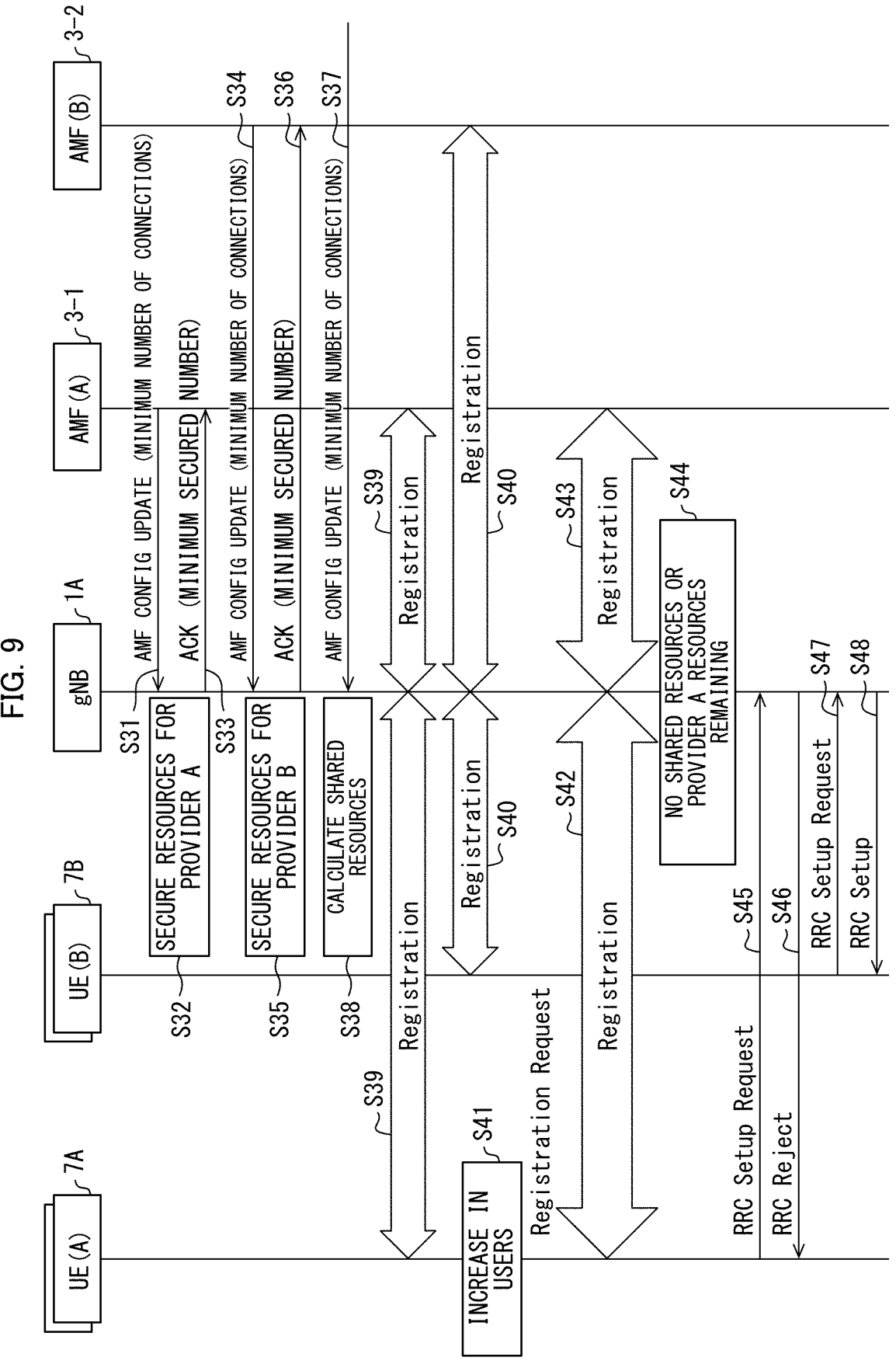
FIG. 9 is a sequence diagram illustrating a processing procedure of the communication system according to the second example embodiment of the present invention.

FIG. 9 is a sequence diagram illustrating a processing procedure of the communication system 100A according to the second example embodiment of the present invention. First, an AMF(A) 3-1 of a core network apparatus 2A-1 of provider A provides notification of the minimum number of connections of subscribers of the provider A when issuing an AMF CONFIGURATION UPDATE with respect to a base station apparatus (gNB) 1A (S31).

Upon receiving the minimum number of connections from the AMF(A) 3-1, the base station apparatus (gNB) 1A secures individual resources for the provider A (S32). In a case where the minimum number of connections notified by the AMF(A) 3-1 is within the range of an allowable value, the base station apparatus (gNB) 1A sets the amount of individual resources for the provider A to an amount in accordance with the minimum number of connections, and notifies the AMF(A) 3-1 of the amount as a minimum secured number, along with an ACK. In a case where the minimum number of connections notified by the AMF(A) 3-1 exceeds the allowable value, the base station apparatus (gNB) 1A sets the amount of individual resources for the provider A to an amount in accordance with the allowable value, and notifies the AMF(A) 3-1 of the amount as a minimum secured number, along with an ACK (S33).

Similarly, upon receiving the minimum number of connections from an AMF(B) 3-2 (S34), the base station apparatus (gNB) 1A secures individual resources for a provider B (S35). In a case where the minimum number of connections notified by the AMF(B) 3-2 is within the range of an allowable value, the base station apparatus (gNB) 1A sets the amount of individual resources for the provider B to an amount in accordance with the minimum number of connections, and notifies the AMF(B) 3-2 of the amount as a minimum secured number, along with an ACK. In a case where the minimum number of connections notified by the AMF(B) 3-2 exceeds the allowable value, the base station apparatus (gNB) 1A sets the amount of individual resources for the provider B to an amount in accordance with the allowable value, and notifies the AMF(B) 3-2 of the amount as a minimum secured number, along with an ACK (S36).

A minimum number of connections is received from another AMF (S37), and resources are secured for a corresponding provider. At this time, once individual resources are secured for all providers, the base station apparatus (gNB) 1A sets shared resources based on individual resources for all providers (S38). For example, the amount of the shared resources is a value obtained by subtracting the combined amount of individual resources of the AMFs of each mobile communication network from the total amount of processing resources of the base station apparatus (gNB) 1A.

Thereafter, registration is carried out between a plurality of UEs(A) 7A and the AMF(A) 3-1 (S39), and registration is carried out between a plurality of UEs(B) 7B and the AMF(B) 3-2 (S40). When there is an increase in new connection requests from UEs(A) 7A (when there is an increase in users) (S41), the remaining shared resources are depleted, and the base station apparatus (gNB) 1A uses the individual resources of the providers of each mobile communication network.

Thereafter, registration is carried out between a plurality of UEs(A) 7A and the AMF(A) 3-1 (S42, S43), and in a case where the remaining individual resources of the provider A are depleted (S44), when the base station apparatus (gNB) 1A receives an RRC setup request from a UE(A) 7A (S45), the base station apparatus (gNB) 1A sends an RRC rejection to the UE(A) 7A (S46) and rejects a new connection request from the UE(A) 7A (S46).

However, when the base station apparatus (gNB) 1A receives an RRC setup request from a UE(B) 7B (S47), because there are remaining individual resources of the provider B, the base station apparatus (gNB) 1A sends an RRC setup to the UE(B) 7B (S48) and allows a new connection request from the UE(B) 7B.

<Example Advantage of Communication System 100A>

As described above, in the communication system 100A according to the present example embodiment, in a case where the minimum number of connections notified by a first mobile communication network among the plurality of mobile communication networks exceeds an allowable value, the setting section 11A of the base station apparatus 1A sets the amount of individual resources for the first mobile communication network to an amount in accordance with the allowable value. Therefore, it is possible to prevent provision of an excess amount of resources to the provider of the first mobile communication network.

Furthermore, the setting section 11A provides notification, to the core network apparatus 2A of the first mobile communication network, via the communication section

13A, of the fact that the minimum number of connections with respect to the first mobile communication network has been set to the allowable value. This makes it possible for the core network apparatus 2A to recognize the minimum secured number allowed by the base station apparatus 1A.

In a case where all of the shared resources have been allocated and all individual resources for a second mobile communication network among the plurality of mobile communication networks have been allocated, the connection control section 12A rejects a new connection request from a terminal apparatus that connects to the second mobile communication network. Thus, the connection control section 12A can suppress the number of connections of subscribers of the second mobile communication network to the minimum number of connections corresponding to the second mobile communication network.

[Software Implementation Example]

The functions of part of or all of the base station apparatuses 1 and 1A, the core network apparatuses 2 and 2A, and the communication systems 100 and 100A can be realized by hardware such as an integrated circuit (IC chip) or can be alternatively realized by software.

Figure 10:
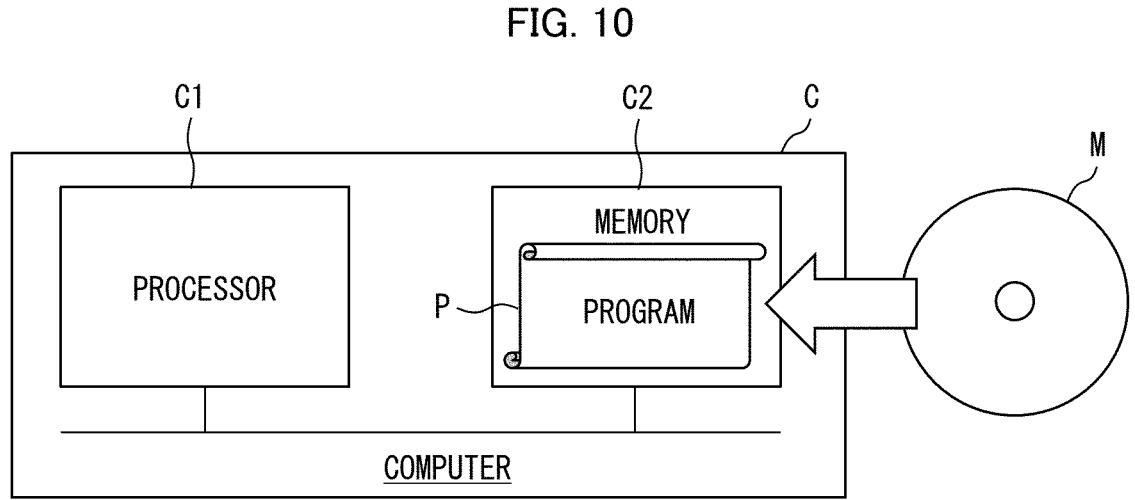
FIG. 10 is a block diagram illustrating a configuration of a computer that functions as a base station apparatus, core network apparatus, and communication system according to each example embodiment.

In the latter case, each of the base station apparatuses 1 and 1A, the core network apparatuses 2 and 2A, and the communication systems 100 and 100A is realized by, for example, a computer that executes instructions of a program that is software realizing the foregoing functions. FIG. 10 illustrates an example of such a computer (hereinafter, referred to as "computer C"). The computer C includes at least one processor C1 and at least one memory C2. The memory C2 stores a program P for causing the computer C to function as any of the base station apparatuses 1 and 1A, the core network apparatuses 2 and 2A, and the communication systems 100 and 100A. In the computer C, the processor C1 reads the program P from the memory C2 and executes the program P, so that the functions of the base station apparatuses 1 and 1A, the core network apparatuses 2 and 2A, and the communication systems 100 and 100A are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a RAM in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the above example embodiments can be described as below. Note, however, that the present invention is not limited to the following supplementary notes.

(Supplementary Note 1)

A base station apparatus including:

a setting means configured to set, based on a minimum number of connections with respect to each of a plurality of mobile communication networks that share the base station apparatus as notified by each of the mobile communication networks, shared resources that are shared by the plurality of mobile communication networks, and individual resources for each of the mobile communication networks, the shared resources and individual resources being from among processing resources of the base station apparatus; and a connection control means configured to, in accordance with a connection request from a terminal apparatus with respect to the base station apparatus, allocate the processing resources to be used for the terminal apparatus from among the shared resources in a case where there is no shortage of the shared resources, and in a case where there is a shortage of the shared resources, allocate the processing resources to be used for the terminal apparatus from among the individual resources for the mobile communication network to which the terminal apparatus will connect.

With the above configuration, when the base station apparatus can operate within the scope of shared resources, there is no need to distinguish between the providers of the mobile communication networks, and the processing load can be reduced.

Furthermore, it is possible to prevent provision of an excess amount of resources to a provider of a specific mobile communication network.

(Supplementary Note 2)

The base station apparatus according to supplementary note 1, in which: in a case where a minimum number of connections notified by a first mobile communication network among the plurality of mobile communication networks exceeds an allowable value, the setting means sets an amount of individual resources for the first mobile communication network to an amount in accordance with the allowable value.

With the above configuration, it is possible to prevent provision of an excess amount of resources to the provider of the first mobile communication network.

(Supplementary Note 3)

The base station apparatus according to supplementary note 2, in which: the setting means provides notification, to a core network apparatus of the first mobile communication network, of the fact that the minimum number of connections with respect to the first mobile communication network has been set to the allowable value.

With the above configuration, it is possible for the core network apparatus to recognize the minimum secured number allowed by the base station apparatus.

(Supplementary Note 4)

The base station apparatus according to any one of supplementary notes 1 to 3, in which: in a case where all of the shared resources have been allocated and all individual resources for a second mobile communication network among the plurality of mobile communication networks have been allocated, the connection control means rejects a new connection request from a terminal apparatus that connects to the second mobile communication network.

With the above configuration, the connection control means can suppress the number of connections of subscribers of the second mobile communication network to the minimum number of connections corresponding to the second mobile communication network.

(Supplementary Note 5)

A core network apparatus of a mobile communication network, including:

a calculation means configured to calculate a minimum number of connections with respect to the mobile communication network, based on statistical information of traffic of the mobile communication network; and a notification means configured to provide notification of the minimum number of connections with respect to the mobile communication network that has been calculated, to a base station apparatus shared by a plurality of mobile communication networks which include the mobile communication network.

With the above configuration, the base station apparatus can easily set the shared resources to be shared by the plurality of mobile communication networks and the individual resources for each mobile communication network.

(Supplementary Note 6)

The core network apparatus according to supplementary note 5, in which:

the calculation means calculates the minimum number of connections with respect to the mobile communication network based on the statistical information of traffic of the mobile communication network, and at least one selected from among information that indicates details of a contract between a provider of the mobile communication network and a provider of the base station apparatus, and a number of registered subscribers of the mobile communication network.

With the above configuration, the core network apparatus can easily calculate the minimum number of connections with respect to the mobile communication network.

(Supplementary Note 7)

A communication system including:

respective core network apparatuses of a plurality of mobile communication networks; and a base station apparatus shared by a plurality of mobile communication networks, the core network apparatuses of the mobile communication networks each including a notification means that provides notification, to the base station apparatus, of a minimum number of connections with respect to a corresponding mobile communication network, the base station apparatus including:

a setting means configured to set, based on a minimum number of connections with respect to each of the mobile communication networks as notified by each core network apparatus of the mobile communication networks, shared resources that are shared by the plurality of mobile communication networks, and individual resources for each of the mobile communication networks, the shared resources and individual resources being from among processing resources of the base station apparatus; and a connection control means configured to, in accordance with a connection request from a terminal apparatus with respect to the base station apparatus, allocate the processing resources to be used for the terminal apparatus from among the shared resources in a case where at least a portion of the shared resources is remaining, and in a case where none of the shared resources are remaining, allocate the processing resources to be used for the terminal apparatus from among the individual resources for the mobile communication network to which the terminal apparatus will connect.

With the above configuration, when the base station apparatus can operate within the scope of shared resources, there is no need to distinguish between the providers of the mobile communication networks, and the processing load can be reduced.

Furthermore, it is possible to prevent provision of an excess amount of resources to a provider of a specific mobile communication network.

(Supplementary Note 8)

The communication system according to supplementary note 7, in which:

the core network apparatuses of the mobile communication networks each further include a calculation means configured to calculate the minimum number of connections with respect to a corresponding one of the mobile communication networks based on statistical information of traffic of the corresponding one of the mobile communication networks.

With the above configuration, the core network apparatuses can easily calculate the minimum number of connections with respect to the mobile communication networks.

(Supplementary Note 9)

A method for controlling a base station apparatus, comprising:

the base station apparatus setting, based on a minimum number of connections with respect to each of a plurality of mobile communication networks that share the base station apparatus as notified by each of the mobile communication networks, shared resources that are shared by the plurality of mobile communication networks, and individual resources for each of the mobile communication networks, the shared resources and individual resources being from among processing resources of the base station apparatus; and the base station apparatus performing, in accordance with a connection request from a terminal apparatus with respect to the base station apparatus, allocation of the processing resources to be used for the terminal apparatus from among the shared resources in a case where there is no shortage of the shared resources, and in a case where there is a shortage of the shared resources, allocation of the processing resources to be used for the terminal apparatus from among the individual resources for the mobile communication network to which the terminal apparatus will connect.

With the above configuration, when the base station apparatus can operate within the scope of shared resources, there is no need to distinguish between the providers of the mobile communication networks, and the processing load can be reduced.

Furthermore, it is possible to prevent provision of an excess amount of resources to a provider of a specific mobile communication network.

(Supplementary Note 10)

A program for causing a computer, which is provided to a base station apparatus shared by a plurality of mobile communication networks, to carry out:

a setting process for setting, based on a minimum number of connections with respect to each of the mobile communication networks as notified by each of the mobile communication networks, shared resources that are shared by the plurality of mobile communication networks, and individual resources for each of the mobile communication networks, the shared resources and individual resources being from among processing resources of the base station apparatus; and a connection control process for, in accordance with a connection request from a terminal apparatus with respect to the base station apparatus, allocating the processing resources to be used for the terminal apparatus from among the shared resources in a case where at least a portion of the shared resources is remaining, and in a case where none of the shared resources are remaining, allocating the processing resources to be used for the terminal apparatus from among the individual resources for the mobile communication network to which the terminal apparatus will connect.

With the above configuration, when the base station apparatus can operate within the scope of shared resources, there is no need to distinguish between the providers of the mobile communication networks, and the processing load can be reduced.

Furthermore, it is possible to prevent provision of an excess amount of resources to a provider of a specific mobile communication network.

(Supplementary Note 11)

A base station apparatus shared by a plurality of mobile communication networks, including:

at least one processor, the processor being configured to carry out:

a setting process for setting, based on a minimum number of connections with respect to each of the mobile communication networks as notified by each of the mobile communication networks, shared resources that are shared by the plurality of mobile communication networks, and individual resources for each of the mobile communication networks, the shared resources and individual resources being from among processing resources of the base station apparatus; and a process for, in accordance with a connection request from a terminal apparatus with respect to the base station apparatus, allocating the processing resources to be used for the terminal apparatus from among the shared resources in a case where at least a portion of the shared resources is remaining, and in a case where none of the shared resources are remaining, allocating the processing resources to be used for the terminal apparatus from among the individual resources for the mobile communication network to which the terminal apparatus will connect.

Note that the base station apparatus can further include a memory. The memory can store a program for causing the processor to carry out the setting process and the allocation process. Further, the program can be stored in a computer-readable non-transitory tangible storage medium.

(Supplementary Note 12)

A core network apparatus of a mobile communication network, including at least one processor, the processor being configured to carry out:

a calculation process for calculating a minimum number of connections with respect to the mobile communication network, based on statistical information of traffic of the mobile communication network; and a notification process for providing notification of the minimum number of connections with respect to the mobile communication network that has been calculated, to a base station apparatus shared by a plurality of mobile communication networks which include the mobile communication network.

Note that the core network apparatus can further include a memory. The memory can store a program for causing the processor to carry out the calculation process and the notification process. Further, the program can be stored in a computer-readable non-transitory tangible storage medium.

REFERENCE SIGNS LIST

1, 1A: Base station apparatus (gNB)
2, 2A: Core network apparatus
3: AMF
4: SMF
5: UPF
6: DN
11: Setting section
11A: Setting section
12: Connection control section
12A: Connection control section
13A, 22A: Communication section
21: Calculation section
21A: Calculation section
22: Notification section
100, 100A: Communication system

The invention claimed is:

1. A base station apparatus comprising:

at least one processor, the at least one processor being configured to carry out:

a setting process for setting, based on a minimum number of connections with respect to each of a plurality of mobile communication networks that share the base station apparatus as notified by each of the mobile communication networks, shared resources that are shared by the plurality of mobile communication networks, and individual resources for each of the mobile communication networks, the shared resources and individual resources being from among processing resources of the base station apparatus; and a process for, in accordance with a connection request from a terminal apparatus with respect to the base station apparatus, allocating the processing resources to be used for the terminal apparatus from among the shared resources in a case where there is no shortage of the shared resources, and in a case where there is a shortage of the shared resources, allocating the processing resources to be used for the terminal apparatus from among the individual resources for the mobile communication network to which the terminal apparatus will connect.

2. The base station apparatus according to claim 1, wherein:

in the setting process, in a case where a minimum number of connections notified by a first mobile communication network among the plurality of mobile communication networks exceeds an allowable value, the at least one processor sets an amount of individual resources for the first mobile communication network to an amount in accordance with the allowable value.

3. The base station apparatus according to claim 2, wherein:

in the setting process, the at least one processor provides notification, to a core network apparatus of the first mobile communication network, of the fact that the minimum number of connections with respect to the first mobile communication network has been set to the allowable value.

4. The base station apparatus according to claim 1, wherein:

in the process for allocating the processing resources, in a case where all of the shared resources have been allocated and all individual resources for a second mobile communication network among the plurality of mobile communication networks have been allocated, the at least one processor rejects a new connection request from a terminal apparatus that connects to the second mobile communication network.

5. A core network apparatus of a mobile communication network, comprising:

at least one processor, the at least one processor being configured to carry out:

a calculation process for calculating a minimum number of connections with respect to the mobile communication network, based on statistical information of traffic of the mobile communication network; and a notification process for providing notification of the minimum number of connections with respect to the mobile communication network that has been calculated, to a base station apparatus shared by a plurality of mobile communication networks which include the mobile communication network, wherein in the calculation process, the at least one processor calculates the minimum number of connections with respect to the mobile communication network based on:

the statistical information of the traffic of the mobile communication network, and at least one selected from among information that indicates details of a contract between a provider of the mobile communication network and a provider of the base station apparatus, and a number of registered subscribers of the mobile communication network.

6. A method for controlling a base station apparatus, comprising:

the base station apparatus setting, based on a minimum number of connections with respect to each of a plurality of mobile communication networks that share the base station apparatus as notified by each of the mobile communication networks, shared resources that are shared by the plurality of mobile communication networks, and individual resources for each of the mobile communication networks, the shared resources and individual resources being from among processing resources of the base station apparatus; and the base station apparatus performing, in accordance with a connection request from a terminal apparatus with respect to the base station apparatus, allocation of the processing resources to be used for the terminal apparatus from among the shared resources in a case where there is no shortage of the shared resources, and in a case where there is a shortage of the shared resources, allocation of the processing resources to be used for the terminal apparatus from among the individual resources for the mobile communication network to which the terminal apparatus will connect.

7. The method for controlling the base station apparatus according to claim 6, wherein:

in the setting, in a case where a minimum number of connections notified by a first mobile communication network among the plurality of mobile communication networks exceeds an allowable value, an amount of individual resources for the first mobile communication network is set to an amount in accordance with the allowable value.

8. The method for controlling the base station apparatus according to claim 7, wherein:

in the setting, notification is provided, to a core network apparatus of the first mobile communication network, of the fact that the minimum number of connections with respect to the first mobile communication network has been set to the allowable value.

9. The method for controlling the base station apparatus according to claim 6, wherein:

in the allocation of the processing resources, in a case where all of the shared resources have been allocated and all individual resources for a second mobile communication network among the plurality of mobile communication networks have been allocated, a new connection request from a terminal apparatus that connects to the second mobile communication network is rejected.

10. A non-transitory storage medium storing therein a program for causing a computer to carry out the method for controlling the base station apparatus according to claim 6.

* * * * *